Sept. 30, 1958 A. E. KOLBE 2,853,986
CRANKCASE VENTILATION SYSTEM
Filed Oct. 7, 1955 2 Sheets-Sheet 1
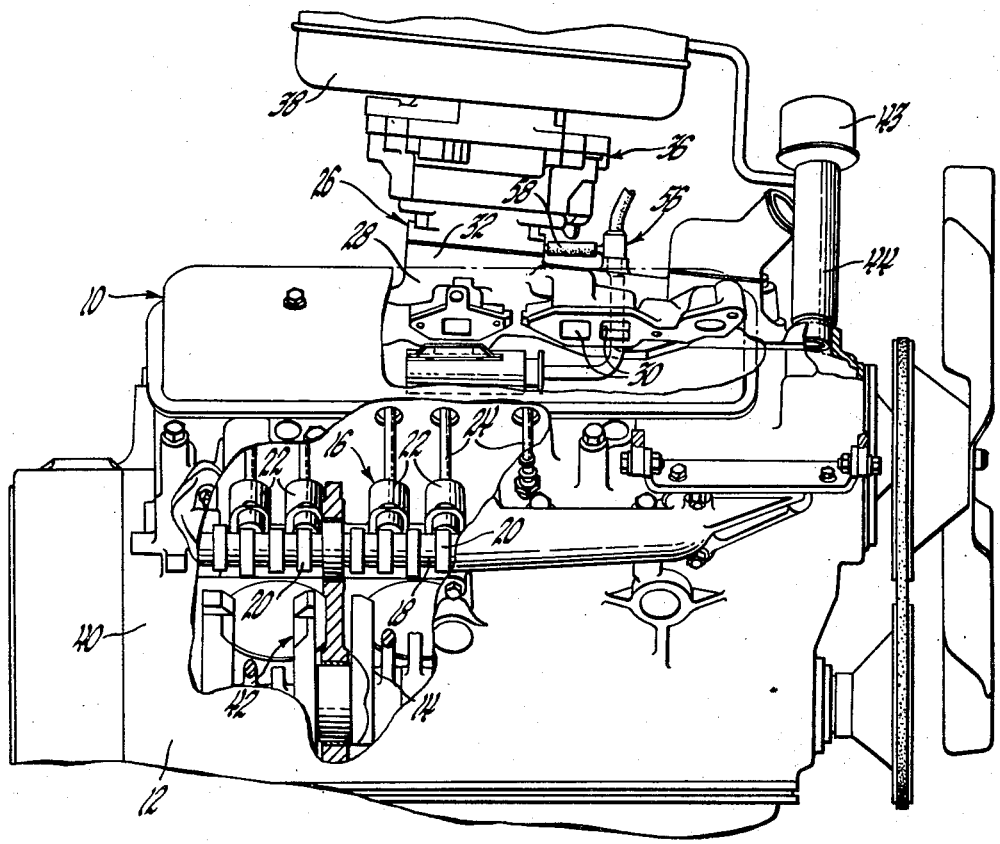
INVENTOR.
Adelbert E. Kolbe
BY
L. D. Burch
ATTORNEY Sept. 30, 1958 A. E. KOLBE 2,853,986
CRANKCASE VENTILATION SYSTEM
Filed Oct. 7, 1955 2 Sheets-Sheet 2

INVENTOR.
Adelbert E. Kolbe
BY
L. D. Burch
ATTORNEY

United States Patent Office 2,853,986
Patented Sept. 30, 1958

2,853,986

CRANKCASE VENTILATION SYSTEM

Adelbert E. Kolbe, Detroit, Mich., assignor to General Motors Corporation, Detroit, Mich., a corporation of Delaware Application October 7, 1955, Serial No. 551,715

10 Claims. (Cl. 123—119)

(Filed under Rule 47(b) and 35 U. S. C. 118)

The present invention relates to internal combustion engines and more particularly to means for ventilating the interiors thereof.

During the operation of an internal combustion engine, a combustible charge of air and a hydrocarbon fuel may be burned in a combustion chamber to perform work on a piston reciprocating in a cylinder. This combustion produces a large number of vaporous byproducts such as water, acids, etc., some of which "blow by" the piston rings. They then travel along the cylinder walls to enter the crankcase where they condense and dilute the lubricants and/or attack the interior of the engine with resultant corrosion thereof. To combat this, it has been the practice to provide a ventilation system for causing fresh air to circulate through the crankcase and camshaft gallery to remove the vapors before they can do any harm.

In one form of ventilation system the air is drawn from the induction system between the throttle valve and the air cleaner, circulated through the crankcase, etc., and returned to the induction system posterior to the throttle valve. Such an arrangement provides a forced draft circulation and insures only filtered air flowing through the induction system. However, in all such systems heretofore, this has resulted in an extensive amount of hosing and/or piping on the exterior of the engine for interconnecting the inlet and outlet of the system with the induction system. In addition, it is necessary to provide a suitable flow control valve in this hosing that will regulate the quantity of air flowing through the crankcase. This has made the system expensive and produced a large number of unsightly and troublesome appendages to the exterior of the engine.

It is now proposed to provide a crankcase ventilation system which will be economical to install and reliable in operation. This is to be accomplished by providing an outlet for the system that includes an integral passage through an intake manifold which is secured to the engine to form a cover for the camshaft gallery and an oil separator secured to the bottom of the intake manifold so as to be disposed in the camshaft gallery for drawing the vapors therefrom. The separator is adapted to separate any particles of oil present in the air and return them to the crankcase. The separator also includes an outlet tube that extends into the passage through the intake manifold. The upper end of this passage is adapted to have a flow control valve disposed therein and secured in place by means of a coupling that is, in turn, directly interconnected with the carburetor throttle body posterior to the throttle valve. Thus the intake vacuum will cause the air to be drawn through the ventilation system.

In the two sheets of drawings:

Figure 1 is a side elevational view of an engine embodying the present invention, portions thereof being broken away to more clearly show the details thereof.

Figure 2 is a cross sectional view of the flow control valve employed in this engine.

Figure 3:
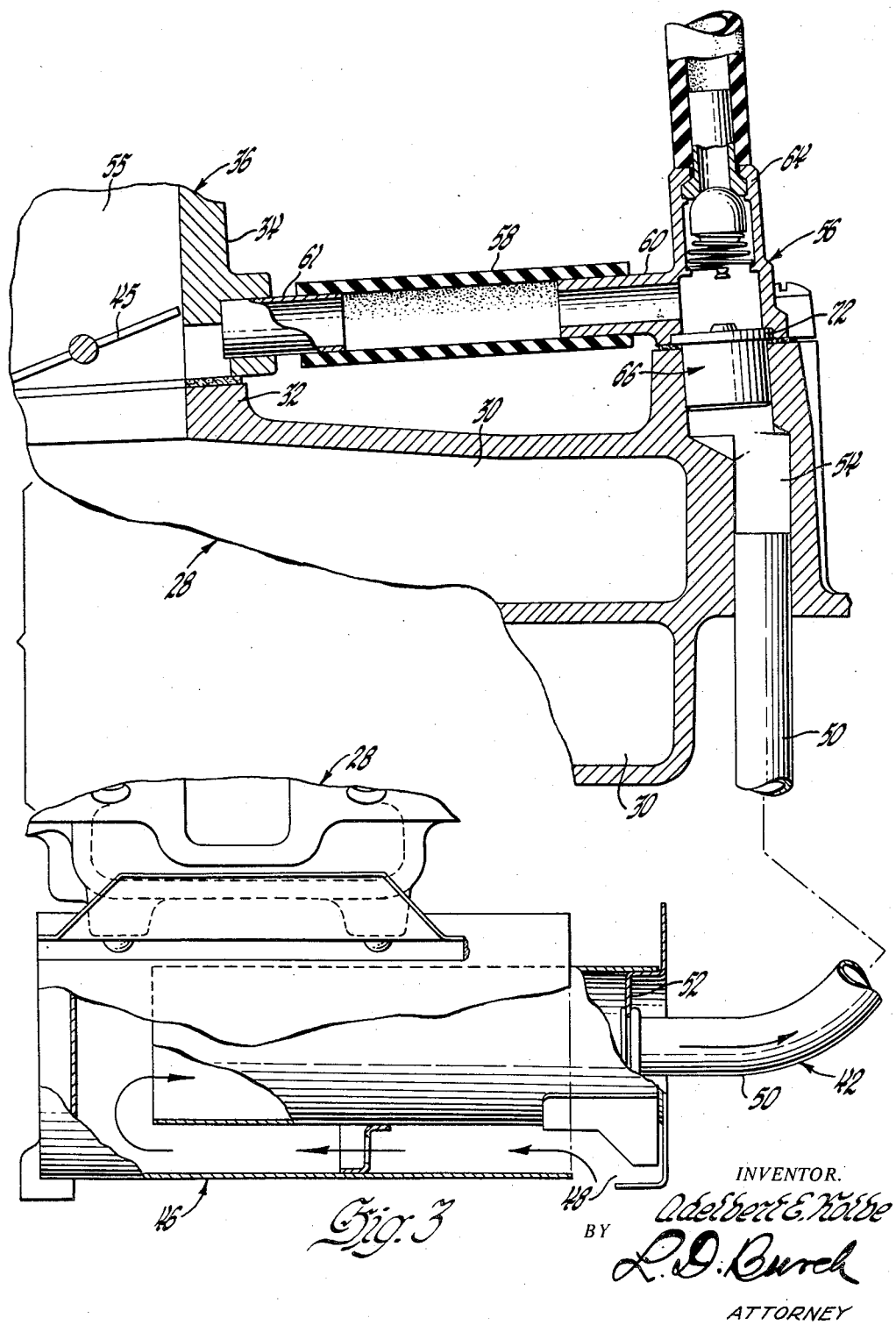
Figure 3 is a fragmentary view showing the outlet portion of the crankcase ventilation system.

Referring to the drawings in more detail, this invention may be embodied in any suitable engine 10. In the present instance this engine 10 is of the so-called V-type having a cylinder block 12 with a pair of angularly disposed banks of cylinders. Each of these cylinders may have a piston reciprocably disposed therein and drivingly connected to a throw on the crankshaft 14 by means of a piston rod. A camshaft gallery 16 may be provided between the two banks of cylinders to receive a camshaft 18 that extends longitudinally of the engine. The camshaft 18 may have cams 20 spaced thereon for engaging the tappets 22 and causing the push rods 24 to open and close the intake and exhaust valves.

In order to charge the cylinders, an induction system 26 may be provided in the space between the two banks of cylinders. The induction system 26 includes an intake manifold 28 that fits against the inner faces of the cylinder heads thus interconnecting the induction passages 30 with the intake passages in the cylinder heads. This manifold 28 also forms a cover for sealing the camshaft gallery 16. The central portion of the manifold includes a carburetor riser 32 that receives the throttle body 34 of the carburetor 36. The carburetor 36 has an air cleaner or filter 38 on top thereof so that the filtered air may flow through the carburetor 36, be charged with fuel and distributed to the various cylinders by means of the induction passages 30 in the intake manifold 28.

In order to remove any harmful by-products of combustion which may accumulate in the camshaft gallery 16 and crankcase 40, a crankcase ventilation system 42 may be provided. The inlet of this ventilation system includes the filler or breather tube 44 which opens into the front end of the camshaft gallery 16. Although the end of this tube 44 is sealed by an airtight cap 43, the tube 44 is interconnected with the charge forming passage in the carburetor 36 at a point between the air cleaner 38 and the fuel jets so that the filtered air that has passed through the air cleaner may flow into the breather tube 44 and downwardly into the camshaft gallery 16. This air will be drawn from in front of the throttle valve 45 and will have substantially atmospheric pressure. The camshaft gallery 16 and crankcase 40 may be interconnected with each other to cause the air to circulate therethrough in any suitable manner for insuring proper ventilation of all parts of the interior of the engine 10. After the air has circulated through the interior and absorbed the harmful vapors therefrom, the air may flow into an oil separator 46 mounted on the bottom of the intake manifold 28. This separator 46 may be especially adapted for separating any oil spray or droplets present in the ventilating air, and allowing it to flow back into the crankcase 40. This not only reduces the oil consumption but also reduces fouling which might otherwise occur from burning the oil in the combustion chamber. The present separator 46 allows the air to enter through an opening 48 on the front end thereof and flow through a tortuous path and leave by an outlet tube 50. One end of this outlet tube 50 is crimped into the end 52 of the separator 46 and the other end is bent to project into the lower end of a passage 54 extending vertically through the intake manifold 28. The upper end of this passage 54 is interconnected with the induction passage 55 through the throttle body 34 by a coupling 56 and a short piece of tubing 58. The coupling 56 consists of an elbow having an arm 60 projecting toward the carburetor 36 to receive one end of the tube 58. The other end of the tube 58 is connected to a fitting 61 on the throttle body 34 communicating with the induction passage 55 posterior to the throttle 45. Thus intake manifold vacuum will be effective to draw the fresh air through the crankcase 40 and produce positive ventilation thereof. A branch 64 on the coupling 56 may provide a convenient source of vacuum for accessories such as window wipers, etc. Since there are wide fluctuations in the manifold vacuum, it is desirable to provide some form of flow control 66 to insure the prescribed flow of air at all times. This control 66 is preferably positioned so that the crankcase 40 will not be reduced to intake vacuum but instead, will be maintained at substantially atmospheric pressure. Accordingly, the control 66 is preferably disposed in the outlet at the upper end of the passage.

In the present instance this control 66 is a flow valve comprising a capsule or housing 68 having a barrel portion 70, the exterior of which snugly fits into the passage 54 and a radial flange 72 that seats on the top of the manifold 28. Thus when the coupling 56 is disposed in place, the flange 72 may be clamped onto the manifold 28. The housing 68 may also include a passage 74 therethrough that has an enlarged portion 76 and a reduced portion 78 that are separated by a shoulder 80. A hollow valve member 82 may be disposed in the enlarged portion 76 so that the tapered end 84 will extend past the shoulder 80 and into the reduced portion 78. A spring 86 normally retains the valve member 82 against a snap ring seat 84. Thus the air leaving the crankcase ventilation system 42 may flow through the center passage 88 of the valve member 82 and also through the space 90 between the tapered end 84 and the shoulder 80. However, as the air flow increases, the pressure drop across the valve member 82 will increase and cause the spring 86 to be compressed until the tapered end 84 engages the shoulder 80, thus forcing all of the air to flow through the center passage 88 of the valve member 82. This will present a sufficient restriction to maintain a substantially constant air flow even at maximum vacuum.

It is to be understood that, although the invention has been described with specific reference to a particular embodiment thereof, it is not to be so limited since changes and alterations therein may be made which are within the full intended scope of this invention as defined by the appended claims.

I claim:

1. A ventilation system for ventilating the interior of an engine having an intake manifold forming a cover for the interior of said engine, a passage extending through said manifold with the inner end thereof communicating with said interior, means secured to said manifold for interconnecting the outer end of said passage with the induction system posterior to the throttle valve.

2. In an engine having an intake manifold forming a cover for a camshaft gallery and having means for mounting a carburetor thereon, a ventilation system for ventilating the interior of said engine comprising a passage extending through said manifold with the inner end thereof communicating with said gallery of said engine, a coupling secured to said manifold for interconnecting the outer end of said passage with said carburetor posterior to a throttle valve therein.

3. In an engine having an intake manifold forming a cover for the interior of said engine and having a carburetor riser with a carburetor mounted thereon, a ventilation system for ventilating the interior of said engine comprising a passage extending through said manifold with the inner end thereof communicating with said interior of said engine, a coupling secured to said manifold for interconnecting the outer end of said passage with said carburetor posterior to a throttle valve therein, a flow control valve disposed in the outer end of said passage for regulating the flow of air through said interior, said valve being retained in said passage by said coupling.

4. In an engine having an intake manifold forming a cover for a camshaft gallery and having a carburetor riser with a carburetor mounted thereon, a ventilation system for ventilating the interior of said engine comprising a passage extending through said manifold with the inner end thereof communicating with said gallery of said engine, a coupling secured to said intake manifold for interconnecting the outer end of said passage with said carburetor posterior to a throttle valve therein, a filler tube communicating with said gallery and being interconnected with said carburetor anterior to said throttle valve.

5. In an engine having an intake manifold forming a cover for the interior of said engine and having a carburetor riser with a carburetor mounted thereon, a ventilation system for ventilating the interior of said engine comprising a passage extending through said manifold with the inner end thereof communicating with said interior of said engine, a coupling secured to said manifold for interconnecting the outer end of said passage with said carburetor posterior to a throttle valve therein, an oil separator mounted on said intake manifold and disposed in said interior, said separator including an outlet interconnected with the inner end of said passage.

6. In an engine having an intake manifold forming a cover for the interior of said engine and having a carburetor riser with a carburetor mounted thereon, a ventilation system for ventilating the interior of said engine comprising a passage extending through said manifold with the inner end thereof communicating with said interior, a coupling secured to said manifold for interconnecting the outer end of said passage with said carburetor posterior to a throttle valve therein, an oil separator mounted on the bottom of said intake manifold and disposed in said interior, said separator having an outlet interconnected with the inner end of said passage, and a flow control valve disposed in the outer end of said passage for regulating the quantity of air flowing through said interior, said valve being retained in said passage by said coupling.

7. In an engine having a pair of angularly disposed banks of cylinders with the interior thereof including a crankcase below said cylinders and a camshaft gallery therebetween, an intake manifold forming a cover for said gallery, a vertical passage extending through said manifold with the lower end thereof communicating with said camshaft gallery and means secured to said manifold for interconnecting the upper end of said passage with a carburetor mounted on said manifold.

8. In an engine having a pair of angularly disposed banks of cylinders with a crankcase therebelow and a camshaft gallery therebetween and an intake manifold forming a cover for said gallery, a ventilation system comprising a vertical passage extending through said manifold with the lower end thereof communicating with said camshaft gallery, a coupling secured to said manifold for interconnecting the upper end of said vertical passage with a carburetor mounted on said manifold, an oil separator secured to the bottom of said manifold and disposed in said gallery, said separator having an outlet interconnected with the lower end of said vertical passage.

9. In an engine having a pair of angularly disposed banks of cylinders with a crankcase therebelow and a camshaft gallery therebetween and an intake manifold forming a cover for said gallery, a ventilation system comprising a vertical passage extending through said manifold with the lower end thereof communicating with said camshaft gallery, a coupling secured to said manifold for interconnecting the upper end of said vertical passage with a carburetor mounted on said manifold, an oil separator secured to the bottom of said manifold and disposed in said gallery, said separator including an outlet interconnected with the lower end of said vertical passage, a flow control valve disposed in the upper end of said vertical passage and secured in said position therein by said coupling.

10. In an engine having a pair of angularly disposed banks of cylinders with a crankcase therebelow and a camshaft gallery therebetween and an intake manifold forming a cover for said gallery, a ventilation system comprising a vertical passage extending through said manifold with the lower end thereof communicating with said camshaft gallery, a coupling secured to said manifold for interconnecting the upper end of said vertical passage with a carburetor on said manifold posterior to the throttle valve in said carburetor, an oil separator disposed in said gallery to form an exhaust for the air flowing therethrough, said separator being secured to said intake manifold with the outlet thereof being interconnected with the lower end of said vertical passage, a flow control valve disposed in the upper end of said passage, said valve being secured in position in said passage by said coupling, and an inlet interconnecting said camshaft gallery with said carburetor anterior to said throttle valve.

References Cited in the file of this patent

UNITED STATES PATENTS

| Number | Name | Date |
|---|---|---|
| 2,056,762 | Barr et al. | Oct. 6, 1936 |
| 2,346,736 | Engstrom et al. | Apr. 18, 1944 |
| 2,359,485 | Lowther | Oct. 3, 1944 |
| 2,423,592 | Foster | July 8, 1947 |
| 2,592,380 | Beckett | Apr. 8, 1952 |
| 2,646,784 | McKeever | July 28, 1953 |